United States Patent [19]
Tidwell

[11] 3,893,533
[45] July 8, 1975

[54] RECREATIONAL VEHICLE

[76] Inventor: Hubert Tidwell, Box 57, Wellington, Utah 84542

[22] Filed: Jan. 25, 1974

[21] Appl. No.: 436,785

[52] U.S. Cl. ............... 180/31; 180/21; 180/33 B; 180/44 R; 280/112 A; 280/275; 280/283
[51] Int. Cl. ............................................. B62k 11/04
[58] Field of Search ......... 180/29, 30, 31, 32, 33 R, 180/33 B, 49, 21, 44 R; 280/112 A, 281, 283, 274, 275, 263

[56] References Cited
UNITED STATES PATENTS

| | | | |
|---|---|---|---|
| 1,107,990 | 8/1914 | Pamer................................ | 180/31 |
| 2,187,238 | 1/1940 | Judd................................. | 280/283 |
| 2,375,046 | 5/1945 | Steele............................... | 180/26 R |
| 2,863,672 | 12/1958 | Murata.............................. | 280/283 |
| 2,913,255 | 11/1959 | Courtney et al................. | 180/33 R |
| 3,199,623 | 8/1965 | Mangum............................ | 180/31 |
| 3,605,929 | 9/1971 | Rolland............................ | 280/282 X |

FOREIGN PATENTS OR APPLICATIONS

| | | | |
|---|---|---|---|
| 7,067 | 9/1913 | United Kingdom............... | 180/33 B |
| 778,246 | 4/1935 | France............................. | 180/21 |

*Primary Examiner*—David Schonberg
*Assistant Examiner*—John P. Silverstrim
*Attorney, Agent, or Firm*—B. P. Fishburne, Jr.

[57] ABSTRACT

A tandem wheel motor vehicle of highly simplified and economical construction is particularly useful on rough terrain but may also be used for personal transportation in urban areas. The vehicle features selectively engageable front and rear wheel drives through direct drive shafts from a centrally located engine. Dual front and rear wheels provide added traction and stability. A high strength, lightweight frame possesses enough resiliency to eliminate the need for springs. Upper and lower frame sections have swiveled connections on longitudinal horizontal axes allowing the riders' seat and steering means to remain level while the vehicle wheels tilt laterally as when cornering or following a hillside.

5 Claims, 8 Drawing Figures

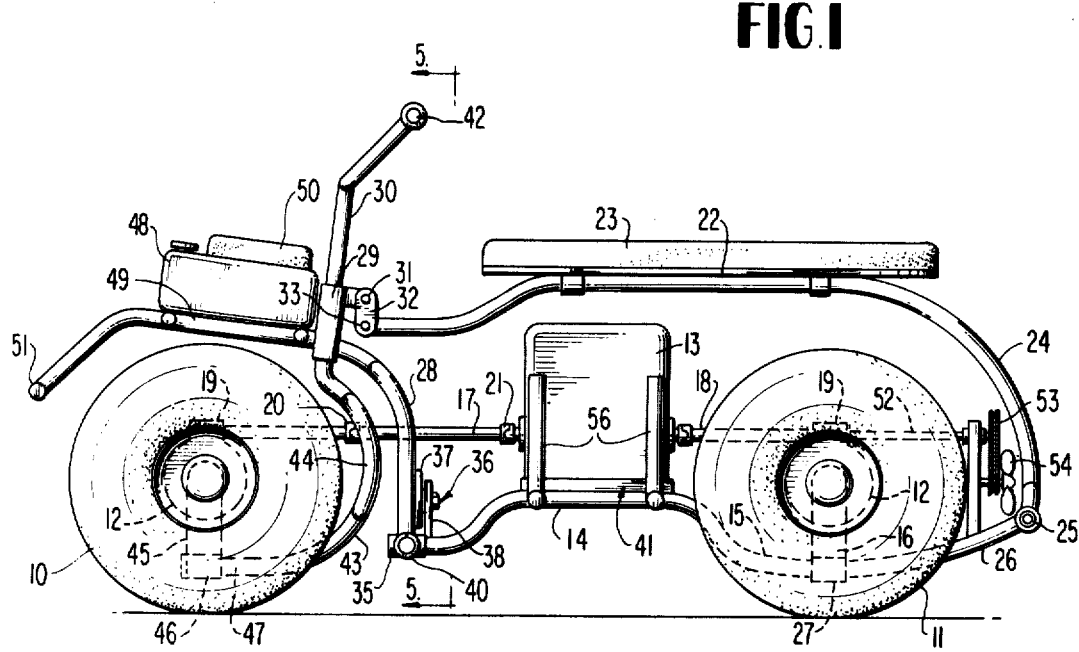
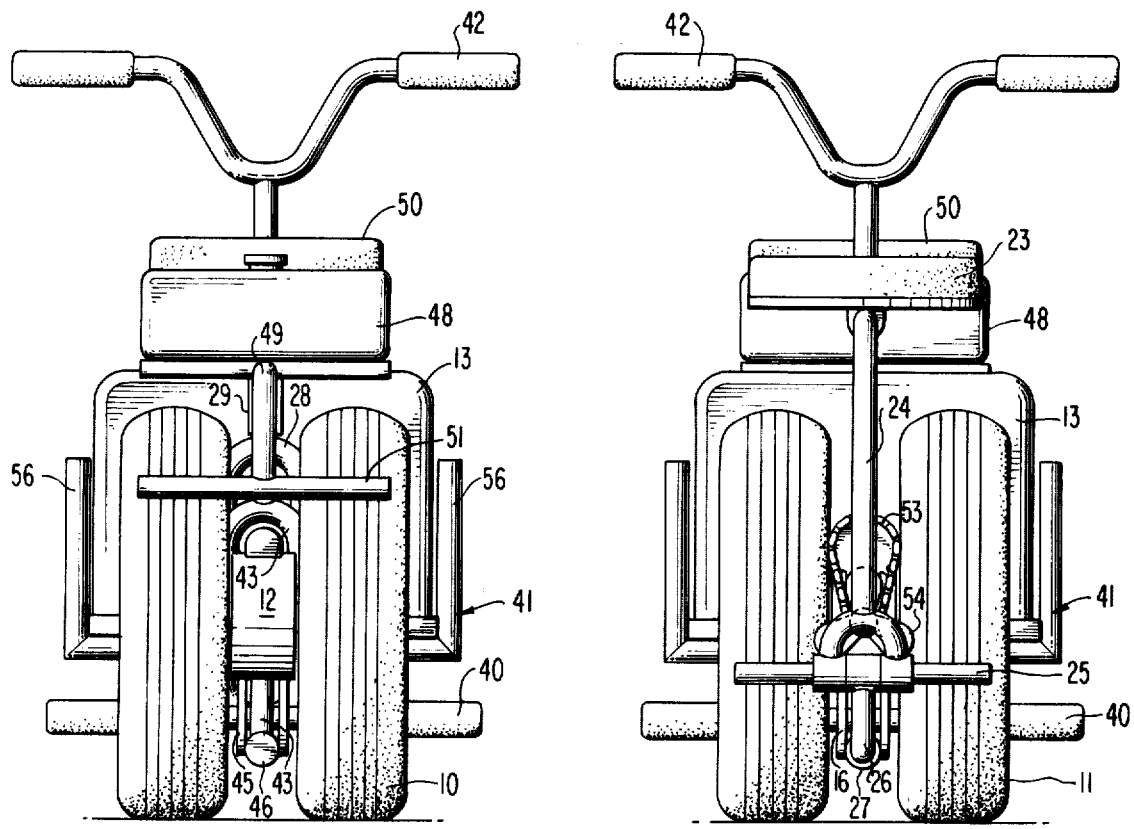
FIG.1
FIG.3
FIG.4

RECREATIONAL VEHICLE

BACKGROUND OF THE INVENTION

A need exists for a more economical and simplified vehicle of the motorcycle type which will possess a much greater range of utility than conventional prior art vehicles. A desirable vehicle of this type should serve the needs of the urban or suburban daily traveler on city streets and highways and should be capable of constituting a recreational vehicle for cross-country travel on rough terrain where no well defined trails or roads exist. Convertibility to water travel is also a desirable feature, and the vehicle should be sufficiently light to be carried by no more than two riders across streams and ditches. In addition to the above features, the ideal vehicle of this type should be rugged and durable so as to require minimum maintenance. No known vehicle in the prior art possesses all of these features.

It is also the objective of this invention to provide a vehicle of the above class, which satisfies the needs of the art and possesses all of the above-enumerated features plus others which will become apparent during the course of the following description.

BRIEF DESCRIPTION OF DRAWING FIGURES

FIG. 1 is a side elevation of a vehicle embodying the invention;

FIG. 3 is a front elevation of the vehicle;

FIG. 4 is a rear elevational view;

FIG. 6 is a view similar to FIG. 3 showing the relationship of vehicle parts while operating along the side of a hill or the like;

DETAILED DESCRIPTION

Figure 2:
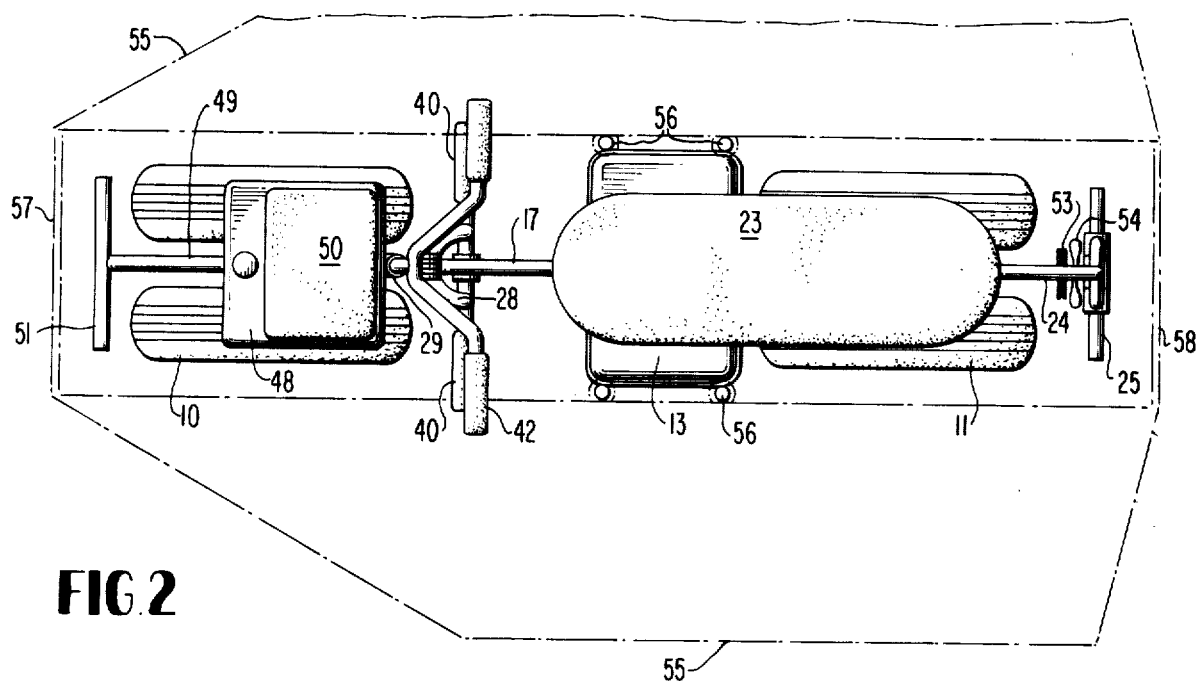
FIG. 2 is a plan view of the vehicle with attachment pontoons shown in phantom line.

Referring to the drawings in detail wherein like numerals designate like parts, reference is made initially to FIGS. 1 through 6 wherein the numerals 10 and 11 designate front and rear dual wheel units of an appropriate size for the vehicle. Each of these wheel units embodies on the axle structure thereof a worm and worm gear drive box 12 of relatively narrow construction so as to fit between the two adjacent rubber tired wheels of the wheel units 10 and 11. The worm gears of the boxes 12 are directly coupled to the axles of the two wheel units 10 and 11 for positively powering the same under certain conditions.

A relatively lightweight engine 13 of a type commercially available is supported between the front and rear wheel units 10 and 11 and located near the longitudinal center of the vehicle on a slightly arched lower vehicle frame section 14, which includes a rear extension arm 15 extending between the two rubber tired wheels of the rear wheel unit 11. The arm 15 has rigidly secured to it an upstanding bearing extension or bracket 16 which receives and supports the axle of rear wheel unit 11.

Forward and rear longitudinal drive shafts 17 and 18 extend from the engine 13 and lie in a common plane with the narrow vehicle frame, and these drive shafts directly drive the worms 19 in the aforementioned drive or gear boxes 12. To facilitate steering, the forward drive shaft 17 has a pair of universal joints 20 and 21 connected therein.

A feature of the invention is that the front and rear dual wheel units 10 and 11 may be powered simultaneously or individually, that is, one without the other, depending upon the type of terrain. Conventional clutch controls, not shown, are provided in ready reach of the driver to engage and disengage the power transmission means leading to the front and rear wheels. The vehicle also has conventional brakes and throttle controls, not shown. Braking means is preferably provided on the drive shafts 17 and 18 rather than on the wheel units. However, conventional wheel brakes including caliper disc brakes may be utilized.

The slender vehicle frame includes an upper frame section 22 on top of which an elongated seat 23 for at least two riders is firmly mounted. Near the rear wheel unit 11, the upper frame section is downwardly curved at 24 and its lower end is pivotally connected through a transverse element 25 with the rear extremity 26 of arm 15.

The rear extremity or portion 26 is formed separately from the arm 15 and is coupled thereto through a horizontal longitudinal axis swivel bearing 27, so that the upper frame section of the vehicle and seat may tilt laterally relative to the wheel units 10 and 11 and relative to the lower frame section 14 and associated parts.

A generally vertical yoke 28 is provided at the forward ends of upper and lower frame sections 22 and 14, and this yoke carries a bearing 29 at its upper end for a steering shaft 30 journaled therein. The bearing 29 is pivoted at 31 to a short suspension shackle 32 which in turn is pivoted at 33 near its lower end to the forward extremity of upper frame section 22 to support the latter yieldingly. Through the pivots 31, 33 and 35, a limited relative movement vertically as well as fore and aft is allowed between the upper and lower frame sections of the vehicle. Also, the resiliency of the frame made from high strength light-weight tubing eliminates the need for springs on the vehicle other than the frame structure itself. This ability of the vehicle frame to absorb ground shocks while supporting riders, the engine and other components is an important feature of the invention.

Below the bearing 29, the yoke 28 straddles the forward drive shaft 17, as shown. The lower end of this yoke carries a second horizontal axis longitudinal sleeve or swivel bearing 35 which is swiveled to the forward end of lower frame section 14 to allow the lateral tilting described in connection with the rear bearing 27 and illustrated by FIG. 6. To limit the degree of this tilting of the upper frame section and seat relative to the wheel units, an adjustable restraint 36 is provided on the yoke 28, FIGS. 1 and 5, near and above the sleeve bearing 35. This restraint can have a variety of forms but preferably comprises an adjustable friction restraint including a slotted plate 37 on the yoke 28 and a coacting bar 38 on the lower frame section 14, coupled to the plate 37 by a friction adjusting screw or bolt 39. Friction lining material similar to brake lining material may be interposed between the opposing elements 37 and 38.

Forward lateral footrests 40 for the driver of the vehicle are secured to the opposite sides of bearing 35 and project therefrom in opposite directions. These footrests, being essentially rigid with the yoke 28 and upper frame section of the vehicle, support the driver's feet in a level manner during cornering or traveling on a hillside, or whenever there is relative tilting of the wheel units 10 and 11 with respect to the seat 23 and upper frame section 22. These footrests assist the driver in maneuvering the vehicle on smooth or rough terrain and during cornering. Because of the wide stance of the dual wheel units 10 and 11, the driver need not remove his feet from the rests 40 while the vehicle is stopped. If desired, an additional footrest or rests for riders behind the driver on the seat 23 may be provided on opposite sides of the engine support or cradle 41.

Figure 6:
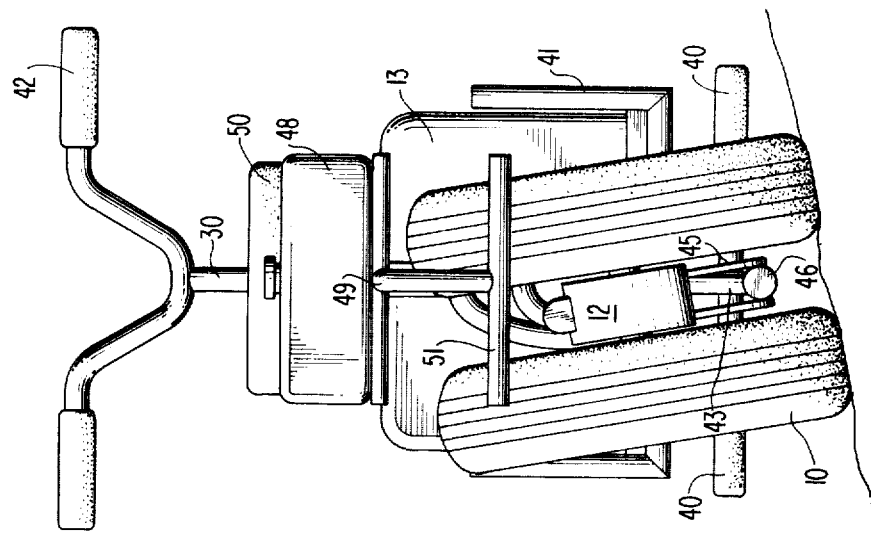
Figure 5:
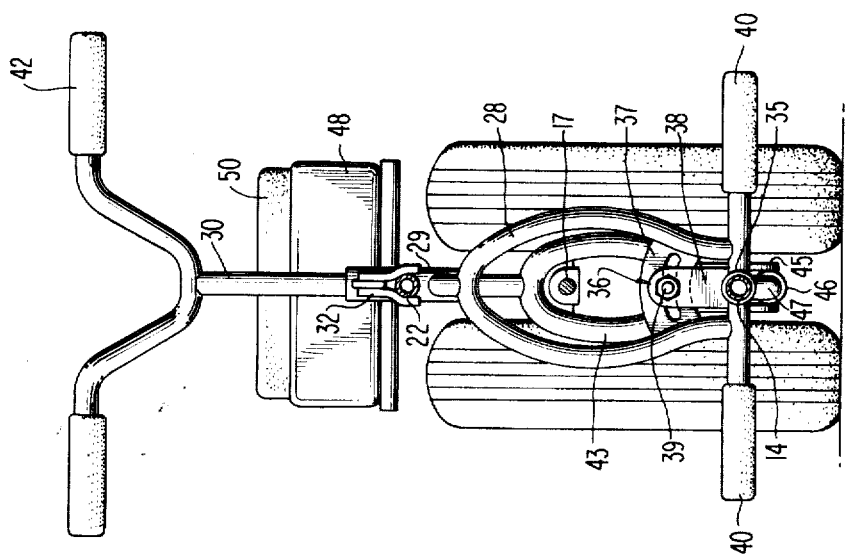
FIG. 5 is a vertical section taken on line 5—5 of FIG. 1.

Below the steering bearing 29 which receives the shaft 30 equipped with the usual handle bars 42 and forming an extension of shaft 30 is a curved front wheel suspension and steering fork 43 which may include side reinforcements 44 near the center of the fork, FIG. 1. The fork 43 supports the front wheel unit 10 through an upstanding bearing extension or bracket 45 similar to the rear element 16. A horizontal axis swivel bearing or sleeve 46 on the lower end of bracket 45 receives the lower forward horizontal extension 47 of steering fork 43 to allow the already-described tilting action of the front wheel unit 10 as depicted in FIG. 6. Thus, the vehicle utilizes three swivel bearings 27, 35 and 46 for this purpose. The axes of these swivel bearings lie in a common vertical plane with the frame sections 14 and 22 but the bearing axes, while parallel, are at slightly different elevations as clearly shown in FIG. 1. The bracket elements 16 and 45 are suitably rigidly secured to the drive boxes 12 by welding or the like.

A fuel tank 48 is attached suitably to a forward extension 49 of fixed yoke 28, and the tank may be equipped with an auxiliary rider's seat 50 above the front wheel unit. A vehicle lifting handle 51 which also serves as a bumper is carried by the forward end of extension 49 and is disposed slightly forwardly of the front wheel unit and above the axle thereof. Similarly, a rear lifting handle for the vehicle is provided by means of extensions on each end of the pivot element 25.

A rearmost longitudinal power take-off shaft 52 operatively connected with the rear box 12 and driven by the rear worm 19 is operatively connected through chain and sprocket gearing 53 with a marine propeller 54, mounted at a sufficiently low elevation to enter the water during stream fording and other amphibian usage of the vehicle. In this connection, outrigged pontoons 55 shown schematically in FIG. 2 will be provided and will be attachable to upstanding bars 56 at the opposite sides of the engine cradle 41 or to other parts of the vehicle frame. Preferably, these pontoons will be lightweight foldable structures which may be easily deployed at the opposite sides of the vehicle with their forward and rear ends interconnected at 57 and 58 for added stability during usage. If preferred, the vehicle may be constructed for land operation only and the entire amphibian means including the pontoons, propeller 54 and power take-off shaft 52 may be omitted.

Figure 7:
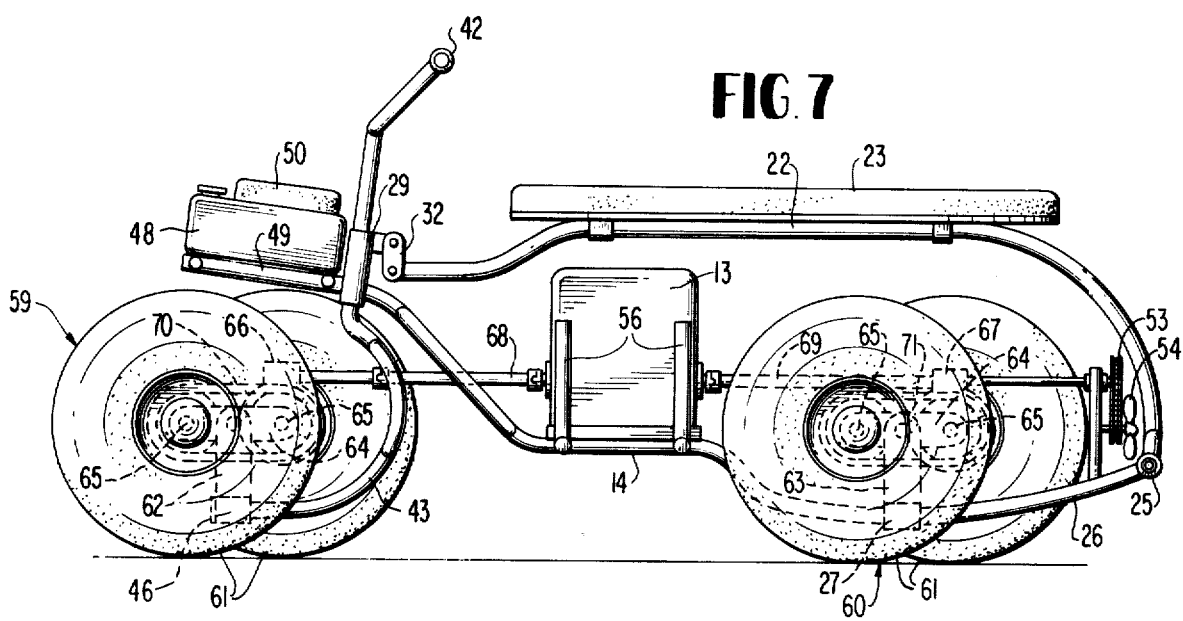
FIG. 7 is a side elevational view showing a modification of the invention.
Figure 8:
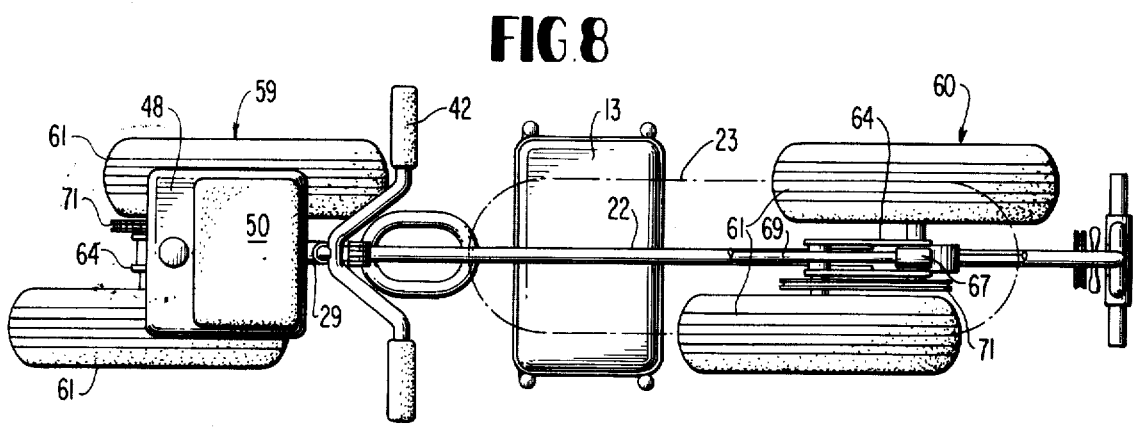
FIG. 8 is a plan view of the invention shown in FIG. 7.

FIGS. 7 and 8 show a modification of the invention wherein the general configuration of the vehicle is unchanged except for the construction of the front and rear wheel units 59 and 60. As shown, the dual wheels 61 which make up these units are staggered or offset longitudinally to provide an even more stable stance for the vehicle and even greater driving traction. Bearing brackets 62 and 63 similar to the brackets 45 and 16 connect the wheel units 59 and 60 with the frame of the vehicle, and each of these brackets has an upper crosshead 64 forming a part thereof and supporting dual axle means 65 on which the dual wheels 61 are mounted.

Worms 66 and 67 from the fore and aft engine-driven drive shafts 68 and 69 power the rearmost dual wheel of each unit through a worm gear drive box arrangement similar to that shown at 12 in the prior embodiment. The forward dual wheels 61 of each unit in turn are positively driven by sprocket chain means 70 and 71 operatively interconnecting the two dual wheels so that they are turned in unison in response to operation of the engine 13. In other respects, except for minor details, the vehicle is constructed and operates in the same manner above-described in relation to the prior embodiment of the invention and no further description is thought to be necessary.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A vehicle comprising forward and rear dual wheel assemblies, a lower vehicle frame section and a separately formed upper frame section, a yoke including a generally upright steering shaft bearing, a longitudinal axis swivel bearing carried by the bottom of the yoke and rotatably receiving the forward end of said lower frame section, means forming a transverse axis pivotal connection between the rear extremity of the lower frame section and the rear end of the upper frame section, an engine mounted on the lower frame section between said forward and rear dual wheel assemblies, fore and aft longitudinal drive shafts connected with and driven by the engine and drivingly connected with said forward and rear dual wheel assemblies, a front steering fork for the vehicle including an upper shaft portion engaged rotatably within said steering shaft bearing and also including a lower longitudinal axis forward extension, a forward bracket carrying the forward dual wheel assembly rotatably and having a lower end longitudinal axis swivel bearing rotatably receiving said lower longitudinal axis forward extension, a rear bracket carrying the rear dual wheel assembly rotatably and having a lower end longitudinal axis swivel bearing rotatably receiving said lower vehicle frame section, and a seat carried by said upper frame section.

2. The structure of claim 1, and drive gear units for the forward and rear dual wheel assemblies coupled with the axles thereof, and drive gears on said fore and aft drive shafts operatively engaged with said drive gear units.

3. The structure of claim 2, and said drive gears on said fore and aft drive shafts comprising worms, said drive gear units having worm gears engaged with said worms.

4. The structure of claim 1, and said lower vehicle frame section being divided at said lower end longitudinal axis swivel bearing of said rear bracket with said rear extremity of the lower frame section rotatably engaged in said swivel bearing.

5. The structure of claim 1, and short suspension shackle means pivotally interconnecting the forward end of the upper vehicle frame section with said yoke through said steering shaft bearing.

* * * * *